Feb. 14, 1961  H. D. HURLBUT, JR  2,972,064
ZERO PHASE MARKER INDICATOR
Filed Nov. 5, 1958
FIG. 1
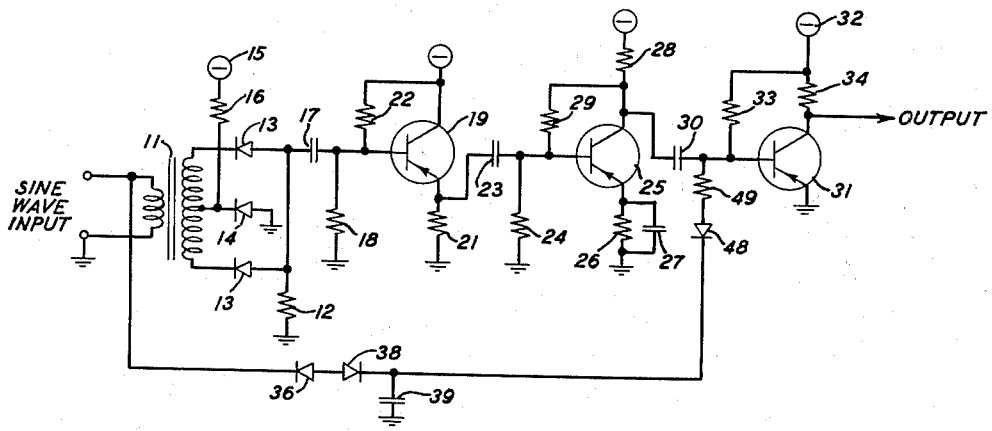
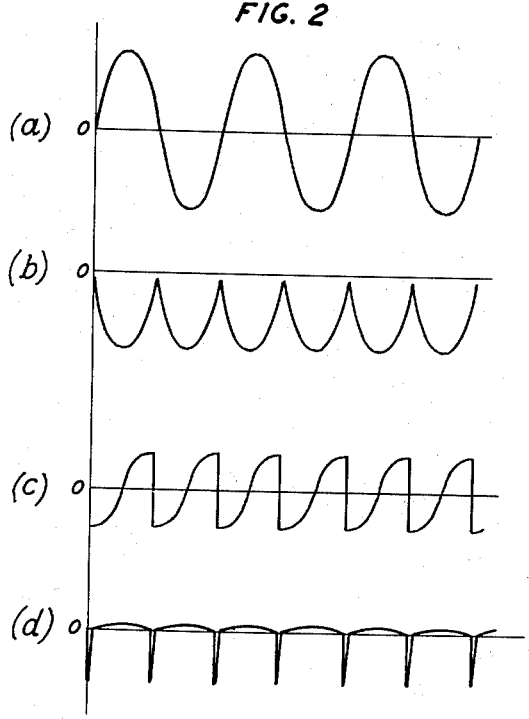
FIG. 2
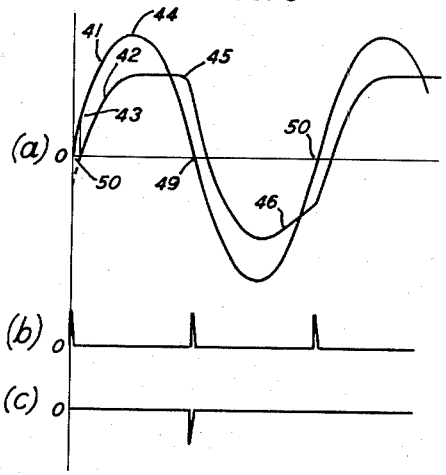
FIG. 3
INVENTOR
H. D. HURLBUT, JR.
BY
Walter M. Hill
ATTORNEY United States Patent Office 2,972,064
Patented Feb. 14, 1961

2,972,064

ZERO PHASE MARKER INDICATOR

Harold D. Hurlbut, Jr., Morristown, N.J., assignor to Bell Telephone Laboratories, Incorporated, New York, N.Y., a corporation of New York Filed Nov. 5, 1958, Ser. No. 772,032

7 Claims. (Cl. 307—88.5)

This invention relates to phase indicators, and more particularly to a circuit for accurately indicating the zero phase occurrence of a signal of cyclically alternating polarity.

In numerous instances, it is necessary that a system, such as radar, sonar or loran, operate in a very exact manner with respect to time and that the various components thereof operate in a definite time relationship to each other. A most popular arrangement, in which these objectives are achieved, makes use of a sine wave oscillator of high frequency stability. A starter pulse or signal is derived from the sine wave and is utilized as a synchronization pulse to obtain the desired time coherence of, and within, the system.

The generated sine wave is generally applied to a pulse shaping circuit wherein it is successively amplified, limited and differentiated to provide the desired pulse. In essence what is done is to convert the sine wave to a square wave, having the same crossover points, and then by differentiation and clipping the latter is reduced to a single starter pulse which corresponds to the zero or one hundred and eighty degree crossover point. The accuracy of the arrangement, of course, depends upon the extent to which the sine wave can be converted into a square wave and the closer the approach to a true square wave the greater the aforementioned correspondence. Close approach to a square wave can be achieved by using multiple stages of amplification and limiting. However, for reasons of economy of circuitry, most arrangements to be found in the art utilize only a single stage of amplification, with the result that some degree of accuracy is sacrificed.

It is the object of this invention to obtain a precise indication of the time of zero phase occurrence of a signal of cyclically alternating polarity.

It is a further object of the invention to provide an indicator employing relatively simple circuitry which will accurately indicate the zero phase point of a sinusoidal signal.

These objects are attained in accordance with the present invention wherein a sine wave signal is rectified in a full-wave rectifier to provide a series of unidirectional pulses having cusp-like intersections which correspond to the crossover points of said sine wave. This latter waveform is differentiated, producing a marker pulse for each cusp. Each marker pulse is applied to a transitorized gating circuit along with the output of a phase shifting circuit to which the original sine wave signal is applied. The gating circuit serves to pass only those marker pulses which are of the same polarity as the coinciding instantaneous values of the phase shifted signal. Thus, alternate marker pulses will be eliminated and the ambiguity, caused by the marker pulses occurring at the zero and one hundred and eighty degree crossover points, will be removed.

Other objects and advantages of the invention will become more apparent by reference to the following description taken in conjunction with the accompanying drawing, wherein:

Fig. 1 is a schematic circuit diagram of a phase indicator according to the principles of the present invention; and Figs. 2 and 3 illustrate certain waveforms useful in explanation of the invention.

Referring to Fig. 1, an input sinusoidal signal, produced for example by a reference oscillator, is applied to the primary of transformer 11. A pair of diodes 13 connect the secondary of the transformer to one end of a load resistor 12, the other end of said resistor being grounded. The center tap of the secondary is connected to ground through a forward biased diode 14. As will be clear to those in the art, this circuit configuration provides full-wave rectification of the input signal. The diodes 13 are poled so as to provide an output of negative polarity across load resistor 12.

The negative potential 15 applied to the diode 14, via resistance 16, serves to forward bias the diode. A small voltage drop is accordingly developed across diode 14 and this forward biases the diodes 13 so that the latter are operated at the forward conducting knee of their characteristic. By thus utilizing only the more abrupt portion of the i.e. characteristic of the diodes, the discontinuities between the rectified unidirectional pulses can be sharpened. Reasonably sharp discontinuities, at the zero and one hundred and eighty degree phase points of the input sine wave, are desirable in this instance for it is these discontinuities which are utilized to provide the marker pulses.

The input sine wave is shown at $a$, in Fig. 2, and the rectified unidirectional pulses at $b$. It will be noted from these waveforms that the discontinuities or cusp-like intersections between the successive pulses of waveform $b$ correspond to the crossover points of waveform $a$.

The rectified signal appearing across the load resistor 12 is applied to a short time constant, R-C differentiating circuit comprising capacitance 17 and, primarily, resistance 18. The output of this latter circuit is fed to a conventional emitter follower circuit. The emitter follower comprises a p-n-p junction type transistor 19 having an emitter connected to ground through resistance 21 and a collector connected directly to a source of negative potential. Bias for the base of transistor 19 is developed across the voltage divider composed of resistances 18 and 22.

The differentiated signal, appearing at the emitter of transistor 19, is illustrated by waveform $c$ of Fig. 2. The waveform $c$ approximates the first derivative of the waveform $b$ and thus when the latter changes sharply, at the discontinuity, from a positive to a negative slope the waveform $c$ changes rapidly from a positive to a negative value.

The signal appearing at the emitter of transistor 19 is fed to a second differentiating circuit comprising capacitance 23 and, primarily, resistance 24. In similar fashion, this latter differentiating circuit provides an output signal which approximates the derivative of the input signal. Thus, with the waveform $c$ delivered to the input, the output waveform of the differentiating circuit will appear as shown at $d$ in Fig. 2. The sharp, negative-going spikes or pulses of the latter correspond to those instances at which the slope of the input signal approaches minus infinity. These instances, of course, in turn correspond to the discontinuity points of waveform $b$.

The output of the second differentiating circuit is applied to a conventional transistor amplifier circuit which comprises a p-n-p- junction type transistor 25. The emitter of transistor 25 is connected to ground through resistance 26 and by-pass capacitance 27. Bias is applied to the collector via resistance 28 and to the base by means of the voltage divider arrangement comprising resistances 28, 29 and 24. As will be clear to those skilled in the art, the pulse type signals appearing at the collector of transistor 25 will be inverted with respect to the spikes or pulses applied to the base.

The positive marker pulses thus developed at the collector of transistor 25 are fed, by means of capacitance 30, to the base of a grounded emitter, p-n-p- junction type transistor 31. The emitter of this transistor is connected directly to ground, while the negative bias potential 32 is connected to the base and collector through the resistances 33 and 34, respectively. With the transistor so biased it will normally conduct heavily. However, the positive pulses applied to the base will tend to temporarily interrupt this conduction for the time duration of said pulses.

The marker pulses, which are applied to the base of transistor 31, occur at the zero and one hundred and eighty degree phase points of the input signal. Since it is desirable to provide only a single pulse per cycle of input signal, means must be provided for eliminating alternate marker pulses. To this end, the input sine wave signal is connected to a phase shifting circuit comprising a pair of breakdown diodes 36, 38 and a capacitance 39. The diodes 36, 38, of a preselected reverse breakdown characteristic, are connected so that the direction of easy current flow for one is the reverse of that for the other. As shown in Fig. 1, these diodes are connected in series, back-to-back, and serve as the resistance through which the sinusoidal signal is applied to capacitance 39.

As the input sine wave rises from zero, one of the series connected diodes isolates it from the capacitance 39 and thus no charge is developed thereon. When the instantaneous value of the sine wave reaches the diode breakdown voltage, however, it will be conducted to the capacitance to charge the same. The resulting voltage produced across the capacitance will then follow the input signal waveform with a constant displacement therefrom equal to said breakdown voltage. This is indicated at *a* in Fig. 3 wherein the input sine wave is designated 41 and the voltage across capacitance is designated 42. For reasons of clearness, the sine wave of Fig. 3 is shown enlarged with respect to the sine wave of Fig. 2. The point 43 represents the instant at which the sine wave reaches a value equal to the diode breakdown voltage. Following breakdown, the waveform 42 follows the sinusoidal waveform 41, with a constant displacement therefrom, until the latter reaches its peak.

When the sine wave reaches its peak, designated point 44 in Fig. 3, the capacitance reaches its maximum charge and essentially maintains this charge until there is again a differential, between the capacitance voltage and the instantaneous value of the sine wave, equal to the said diode breakdown voltage. That is, when the voltage of the sine wave drops to a value such that the difference between it and the voltage across the capacitance 39 is equal to said breakdown voltage the other diode breaks down and the capacitance voltage will then again follow the sine wave, passing through zero and reversing in polarity. The breakdown of the other diode corresponds to point 45, in Fig. 3, and thereafter the waveform 42 follows waveform 41 until the latter reaches its negative peak.

As the sine wave passes through its negative peak and continues in a positive slope, the charge on the capacitor leaks off through the path comprising diode 48, resistance 49 and the base-to-emitter impedance of the conductive transistor 31. This leakage is shown at 46 in Fig. 3. During the leakage period the sine wave is isolated from the capacitance 39, but when the aforementioned differential voltage again equals the diode breakdown voltage the capacitance voltage again begins to "track" the input sine wave until the latter reaches its positive peak. The cycle of events thereafter repeats itself. The waveform 42 is both delayed and distorted with respect to the sinusoidal waveform 41. This distortion, however, is of no consequence in the present invention.

The diode 48 is poled so as to prevent the "positive-going" excursions of waveform 42 from being applied to the base of transistor 31; the "negative-going" excursions, of course, are so applied. Accordingly, if a marker pulse is fed to said base during a negative-going period, the low current, positive marker pulse will be mixed with the rather high current negative signal from the phase shifter with the result that the total thereof will maintain the transistor in the "On" state. In contrast, during the positive-going excursions of waveform 42 the transistor 31 is no longer loaded by the phase shift circuit and hence a positive marker pulse applied to the base will result in an amplified pulse output at the collector.

The described "gating" operation is graphically illustrated in Fig. 3. The successively generated marker pulses are illustrated in waveform *b* and these occur in time correspondence with the crossover points of sine wave 41. Disregarding the very first marker pulse, the second and all even numbered marker pulses will occur during the positive-going excursions of the waveform 42, while the third and all subsequent odd numbered marker pulses occur during the negative-going excursions. Accordingly, as illustrated at *c* in Fig. 3, only the even numbered marker pulses appear as an output signal at the collector of transistor 31.

If the crossover point 49 of sine wave 41 is arbitrarily designated the point of zero phase, an accurate indication will be provided of the same once per cycle. In most instances, it is immaterial which of the crossover points is designated the point of zero phase. However, should it be necessary to provide an indication of the cross-over point 50 of waveform 41, the same may be readily achieved by reversing the ground and phase shift circuit connections to the input terminals.

The present invention may be used over a range of input frequencies because the angular phase shift, provided by the disclosed phase shifting circuit, is independent of the frequency of the applied signal. Further, as will be clear to those in the art, the input signal need not be sinusoidal. That is, the invention may be used to indicate the zero phase occurrence of any cyclically alternating signal.

While p-n-p junction type transistors have been shown in Fig. 1, it will be clear that transistors of the other conventional types may be used. Accordingly, it is to be understood that the foregoing disclosure relates to only a preferred embodiment of the invention and that numerous modifications or alterations may be made therein without departing from the spirit and scope of the invention.

What is claimed is:

1. A circuit for providing a marker indication of the zero phase occurrence of an input signal of cyclically alternating polarity comprising full-wave rectifying means for rectifying said input signal, differentiating means connected to said rectifying means for producing a phase marker pulse after each half cycle of said rectified signal, means for phase shifting said input signal, output means, and means for applying said marker pulses and the phase shifted signal to said output means, said output means being adapted to produce an output pulse each time a marker pulse and the phase shifted signal have the same polarity.

2. A circuit for providing a marker indication of the zero phase occurrence of an input signal of cyclically alternating polarity comprising full-wave rectifying means for rectifying said input signal, differentiating means connected to said rectifying means for producing a phase marker pulse of predetermined polarity after each half cycle of the rectified signal, means for phase shifting said input signal, and means coupled to the differentiating means and the phase shifting means for eliminating those marker pulses which are of a selected polarity relationship with respect to the coinciding instantaneous values of the phase shifted signal.

3. A circuit for providing a marker indication of the zero phase occurrence of a sine wave signal comprising full-wave rectifying means responsive to said sine wave to produce a series of pulses having cusp-like intersections corresponding to the crossover points of said sine wave, differentiating means connected to said rectifying means for producing a marker pulse for each cusp, means for phase delaying said sine wave signal, and gating means coupled to said differentiating means and the phase delaying means, said gating means serving to pass only those marker pulses which are of a predetermined polarity relationship with respect to the coinciding instantaneous values of the phase delayed signal.

4. A circuit in accordance with claim 3 wherein the phase shifting means comprises a pair of series connected breakdown diodes, said diodes being connected so that the direction of easy current flow for one is the reverse of that for the other.

5. A circuit for providing a marker indication of the zero phase occurrence of a sine wave comprising full-wave rectifying means responsive to said sine wave to produce a series of pulses having cusp-like intersections corresponding to the crossover points of said sine wave, differentiating means connected to said rectifying means for producing a marker pulse of predetermined polarity for each cusp, means responsive to said sine wave to produce a signal of cyclically alternating polarity which is delayed with respect to said sine wave, and gating means coupled to said differentiating means and the delay means, said gating means serving to pass only those marker pulses which are of the same polarity as the coinciding instantaneous values of the delay signal.

6. A circuit for providing a marker indication of the zero phase occurrence of a sine wave comprising full-wave rectifying means responsive to said sine wave to produce a series of pulses having cusp-like intersections corresponding to the crossover points of said sine wave, differentiating means connected to said rectifying means for producing a marker pulse of given polarity for each cusp, means responsive to said sine wave to produce a signal of cyclically alternating polarity which is delayed with respect to said sine wave, a transistor amplifier having a predetermined normal state of conduction, diode means serving to couple to said transistor amplifier those excursions of said cyclically alternating signal which are of a preselected polarity, said excursions serving to maintain said transistor amplifier in said predetermined state of conduction, and means coupling said marker pulses to said transistor amplifier to momentarily change the state of conduction thereof when the same is not being maintained under the influence of said excursions.

7. A circuit for providing a marker indication of the zero phase occurrence of a sine wave comprising full-wave rectifying means responsive to said sine wave to produce a series of pulses having cusp-like intersections corresponding to the crossover points of said sine wave, differentiating means connected to said rectifying means for producing a marker pulse of given polarity for each cusp, means responsive to said sine wave to produce a signal of cyclically alternating polarity which is delayed with respect to said sine wave, a normally conductive transistor amplifier, diode means serving to couple the negative excursions of said cyclically alternating signal to said transistor amplifier to maintain the conduction thereof, and means coupling said marker pulses to said transistor amplifier to interrupt the conduction thereof when the same is not being maintained under the influence of said negative excursions.

References Cited in the file of this patent

UNITED STATES PATENTS

| | | |
|---|---|---|
| 2,751,545 | Chase | June 19, 1956 |
| 2,751,550 | Chase | June 19, 1956 |
| 2,758,278 | Adams | Aug. 7, 1956 |

FOREIGN PATENTS

| | | |
|---|---|---|
| 438,608 | Italy | Aug. 17, 1948 |